United States Patent
Ishiharada

(10) Patent No.: US 6,641,290 B2
(45) Date of Patent: Nov. 4, 2003

(54) LAMP DEVICE FOR A VEHICLE

(75) Inventor: Minoru Ishiharada, Saitama (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/992,698

(22) Filed: Nov. 21, 2001

(65) Prior Publication Data

US 2002/0054494 A1 May 9, 2002

Related U.S. Application Data

(63) Continuation of application No. PCT/JP00/04734, filed on Jul. 14, 2000.

(30) Foreign Application Priority Data

| Jul. 16, 1999 | (JP) | 11-203435 |
| Jul. 22, 1999 | (JP) | 11-207989 |
| Jul. 27, 1999 | (JP) | 11-212413 |

(51) Int. Cl.$^7$ .............................. B60Q 1/24; B60Q 1/32
(52) U.S. Cl. ..................... 362/495; 362/511; 362/582; 362/560
(58) Field of Search ............................... 362/511, 495, 362/582, 560

(56) References Cited

U.S. PATENT DOCUMENTS

| 4,463,962 A |   | 8/1984  | Snyder |        |
| 4,733,332 A | * | 3/1988  | Yamashita et al. | 362/32 |
| 5,027,259 A | * | 6/1991  | Chujko | 362/32 |
| 5,432,876 A | * | 7/1995  | Appeldorn et al. | 385/31 |
| 5,579,429 A | * | 11/1996 | Naum | 385/143 |
| 5,845,038 A | * | 12/1998 | Lundin et al. | 385/901 |
| 5,915,830 A | * | 6/1999  | Dickson et al. | 362/495 |
| 5,982,969 A | * | 11/1999 | Sugiyama et al. | 385/123 |
| 6,154,595 A | * | 11/2000 | Yokogawa et al. | 385/127 |
| 6,169,836 B1 | * | 1/2001 | Sugiyama et al. | 385/123 |
| 6,190,027 B1 | * | 2/2001 | Lekson | 362/495 |
| 6,250,785 B1 | * | 6/2001 | Mallia et al. | 362/511 |

FOREIGN PATENT DOCUMENTS

| DE | 195 40 813 | 9/1996 |
| EP | 0 236 212  | 9/1987 |
| EP | 0 498 451  | 8/1992 |
| EP | 0 594 089  | 4/1994 |

(List continued on next page.)

OTHER PUBLICATIONS

Atchison D. J. et al, "Lighting Up With Plastic Optical Fibers" Machine Design, Penton, Inc. Cleveland, US, vol. 67, No. 14, Aug. 10, 1995, p. 78, 80, 82.

Decker D, "Celis–Ein Konzept Fur Die PKW–Innerraumbelechchtung Mit Lightleittechnik Celis–Interior Lighting With Translucent Components", Atz Automobiltechnische Zeitschrift, Franckh, Sche Verlagshandlung. Stuttgart, Germany, vol. 97, No. 7/8, Jul. 1, 1995, pp. 480, 482–483.

*Primary Examiner*—Sandra O'Shea
*Assistant Examiner*—Jacob Y. Choi
(74) *Attorney, Agent, or Firm*—Kanesaka & Takeuchi

(57) ABSTRACT

A vehicle equipped is with a light-emitting apparatus at an underside of an entrance thereof, wherein the light-emitting apparatus has a light transmitting tube which emits light from its circumferential surface, and a light source which is installed at one end of the light transmitting tube. The light transmitting tube has a tubular cladding, a core situated inside the tubular cladding and formed of a material having a refractive index higher than that of the tubular cladding, and a belt-like reflective layer formed between the tubular cladding and the core. The light transmitting tube is an extrusion molded product integrally and simultaneously formed by the tubular cladding, core and reflective layer. Light passing through the core is reflected and scattered by the reflective layer and emitted from an outer surface area opposite to the reflective layer of the tubular cladding.

8 Claims, 10 Drawing Sheets

FOREIGN PATENT DOCUMENTS

| | | |
|---|---|---|
| EP | 0 899 503 | 3/1999 |
| FR | 2 761 029 | 9/1998 |
| JP | 5-313015 | 11/1993 |
| JP | 9-152360 | 6/1997 |
| JP | 9-207661 | 8/1997 |
| JP | 10-133026 | 5/1998 |
| JP | 10-157511 | 6/1998 |
| JP | 11-6918 | 1/1999 |

* cited by examiner

Fig. 15
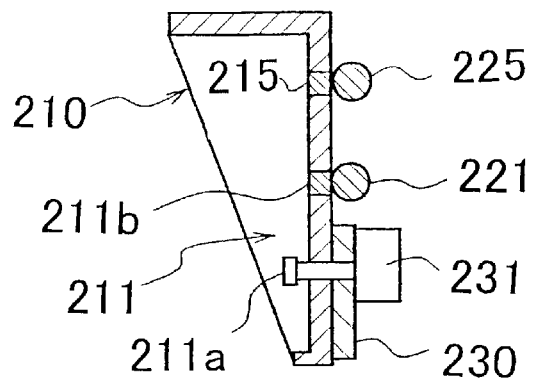
Fig. 16
Fig. 17
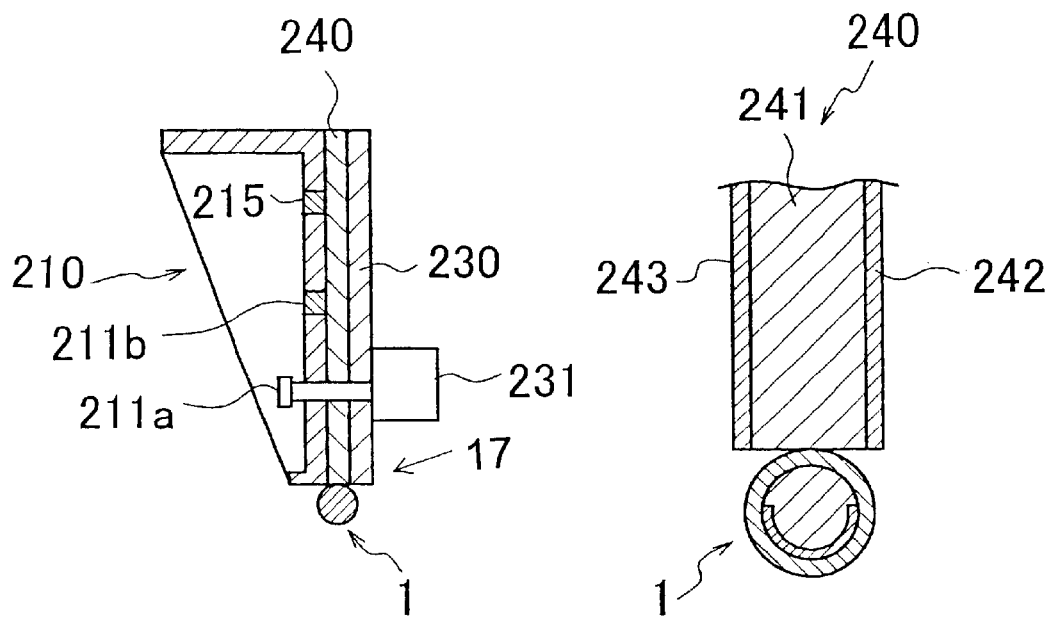

LAMP DEVICE FOR A VEHICLE

CROSS REFERENCE TO RELATED APPLICATION

This is a continuation application of PCT/JP00/04734 filed on Jul. 14, 2000.

FILED OF THE INVENTION

The present invention relates to a vehicle which is equipped with a light-emitting apparatus at a lower part of its entrance. The present invention also relates to a lamp device for a vehicle such as a stop lamp, a tail lamp and a winker lamp, particularly relates to a lamp device for a vehicle in which a light transmitting tube is used as a light emitting portion.

BACKGROUND OF THE INVENTION

A bus is conventionally equipped with a lamp for lighting up steps at the entrance thereof. A car is equipped with a lamp at the underside of the inside of a door thereof so that the lamp lights up the entrance of the car when the door opens.

It takes a lot of time to change the lamp when the lamp is down, because it is necessary to remove screws for a lamp cover.

A conventional lamp device for a vehicle has a lamp and a reflective board, and there is a space between the reflective board and a transparent board or a lens installed in front of the reflective board. The conventional lamp device for a vehicle has a large thickness because of the space. Furthermore, it is considerably expensive to manufacture a lamp device having a curved shape which imitates a curve of a car body.

As well known, a meter case installed in an instrument panel of a vehicle is equipped with a speedometer, a tachometer, an odometer, a water temperature gauge of a radiator, a winker lamp, and a lamp for lighting up the front of the meter case, etc. In order to improve visibility at night of indicators such as the speedometer, the meter case is provided with transparent parts made of slit or transparent synthetic resin which are formed in shapes corresponding to scales of the speedometer, numbers, and the like.

An electronic circuit unit is installed on the back of the meter case. The electronic circuit outputs driving signals to meters including the speedometer, the tachometer, and the like installed in the meter case, and also checks trouble or failure of the meters. The electronic circuit unit is integrally equipped with a support case consisting of a shield cover and the like, and the support case is fixed to the meter case with screws. The shield cover covers a circuit substrate which is mounted with electronic parts of the circuit unit in order to shield electromagnetic wave.

A flexible wire board for the meters is installed on the back of the meter case. The meters in the meter case are electrically connected with the electronic circuit unit by lead wires and connectors. A light bulb for illumination with a socket which permits installation and removal of the bulb is installed on the flexible wire board and is electrically connected with the flexible wire board.

It takes a lot of time to change lamps installed on the back of the meter case when these lamps are down, because it is necessary to separate the electronic circuit unit completely from the meter case by removing screws which fix the electric circuit unit to the meter case and by removing connectors, too.

Japanese patent publication H9-282918A disclosed a back light system for a meter of a vehicle, which is equipped with a light transfer board, a fluorescent tube along the edge of the light-transfer board, a reflective sheet on the back of the light-transfer board, and a diffuser panel disposed on the front of the light-transfer board. The back light system does not need light bulbs on the back of the meter case. However, the lifetime of the fluorescent tube is relatively short, and it takes considerable time to change the fluorescent tube because it is necessary to remove the meter case from an instrument panel.

OBJECT AND SUMMARY OF THE INVENTION

The first object of the present invention is to provide a vehicle having a light-emitting apparatus at the lower part of the entrance thereof, in which the light-emitting apparatus is low in weight and is excellent in durability, and furthermore, the light-emitting apparatus has a light source which can be repaired easily.

A vehicle of the present invention has a light-emitting apparatus at the underside of the entrance thereof. The light-emitting apparatus has a light transmitting tube which emits light from the circumferential surface, and a light source installed at one end of the light transmitting tube.

Light from the light source is introduced into the light transmitting tube and emitted from the circumferential surface of the light transmitting tube.

The light transmitting tube may be arranged at the underside of the entrance without a cover, so as to make the light-emitting apparatus extremely low in weight. However, the light transmitting tube may be covered with a transparent cover in order to hold and protect the light transmitting tube and prevent from leakage of light.

The light-emitting apparatus can be installed in a vehicle which is tall and has a running board at the underside of the entrance, such as a vehicle of off-road type, particularly in a manner where the light transmitting tube thereof is installed at the edge of the running board. In this case, the light transmitting tube installed in the running board can be extended so that the light source is arranged in a place which is far from the running board and in which the light source can be maintained easily.

The second object of the present invention is to provide a light device for a vehicle wherein the light device is low in weight and good in durability, and is easy to be formed in a curved shape corresponding to the shape of a car body which is formed in various curved shapes, and furthermore, the light device has a light source which can be repaired easily.

A lamp device for a vehicle of the present invention has a main body with a transparent part and a light-emitting apparatus installed at the back of the main body thereof. The light-emitting apparatus has a light transmitting tube which emits a light from its circumferential surface and a light source installed on one end of the light transmitting tube.

Light generated from the light source is introduced into the light transmitting tube and emitted from its circumferential surface, and the light passes through the transparent part of the main body of the lamp device and is emitted out.

The light transmitting tube may be arranged at the back of the transparent part without a cover, thereby making the lamp device extremely lightweight. However, the light transmitting tube is preferably arranged between the transparent part of the case and a reflective backing plate in order to hold and protect the light transmitting tube and prevent it from a leakage of light.

The light transmitting tube installed in the running board can be extended so that the light source is arranged in a place which is far from the running board and in which the light source can be maintained easily.

The third object of the present invention is to provide a meter case which is low in weight and excellent in durability and has a light source which can be repaired easily.

A meter case according to an aspect of the present invention has a main body having a transparent part, and an illuminating apparatus installed on the back of the main body. The illuminating apparatus has a light transmitting tube which emits light from its circumferential surface, and a light source installed at one end of the light transmitting tube.

Light from the light source is introduced into the light transmitting tube and emitted from its circumferential surface, so that the light is directed to the transparent part of the main body of the meter case.

A meter case according to another aspect of the present invention has a main body having a transparent part, a light-transfer board installed on the back of the main thereof, and an illuminating apparatus used for applying light to the end of the light-transfer board. The illuminating apparatus has a light transmitting tube and a light source disposed at one end of the light transmitting tube.

Light generated from the light source is introduced into the light transmitting tube and emitted from its circumferential surface, and the light enters into the light-transfer board through its end surface. The light emitted from the surface of the light-transfer board is directed to the transparent part of the main body of the meter case.

In each of these meter cases, the light transmitting tube can be extended so that the light source is positioned in a place which is far from the meter case and in which the light source can be maintained easily.

The light transmitting tube can be equipped with a tubular cladding and a core made of a material having higher refractive index than that of the tubular cladding. The light transmitting tube may be equipped with a belt-like reflective layer formed between the tubular cladding and the core along the longitudinal direction of the tubular cladding so that a light passing through the core is allowed to be reflected and scattered by the reflective layer and emitted from the side surface opposite to the reflective layer of the cladding.

In the light transmitting tube having the belt-like reflective layer formed between the tubular cladding and the core along the longitudinal direction of the tube, a strong light passing through the core (having the greatest capacity for transmitting light than the other portions in the light transmitting tube) is reflected by the belt-like reflective layer, and the strong light having a high directivity is emitted from a part of the outer surface area of the tube opposite to the reflective layer. As a result, the brightness of light emitted from the light transmitting tube is considerably high and thus the light transmitting tube emits a highly bright light.

The tubular cladding can be made of a (meth-)acrylic polymer, the core is made of a polystyrene, a polycarbonate, or a styrene-(meth-)acrylic copolymer, and the reflective layer is made of a (meth-)acrylic polymer containing a white color pigment or a light scattering material.

The light transmitting tube can be manufactured with high productivity and at low cost by the following method: a multiple color extrusion molding machine, for example, a three-material extrusion molding machine having three screw sections, is used; a material for the core (core material), a material for the cladding (cladding material), and a reflective material containing a white color pigment or a light scattering material are simultaneously introduced into each nozzle on the extrusion molding machine; in a simultaneous manner, the core material is extruded to be formed into a solid cylindrical core member, the reflective material is extruded into plural belt-like reflective layers formed on the outer surface of the solid cylindrical core member, the cladding material is extruded into a tubular member covering the solid cylindrical core member and the belt-like reflective layers, so that the belt-like reflective layers are formed between the tubular cladding and the core in the longitudinal direction thereof.

The light transmitting tube may be made only of a polymethyl (meth-)acrylate (PMMA), or may be equipped with a core made of PMMA and belt-like reflective layers formed on the outer surface of the core in the longitudinal direction thereof. The light transmitting tube may also be provided with grooves or concave holes which penetrate the reflective layer to reach the core. The core can be formed by extrusion molding method, injection molding method, cast molding method, and the like. It is preferred that the reflective layer includes $TiO_2$, $BaSO_4$, silica, and the like. The reflective layer can be formed by extrusion molding, coating, printing, and the like.

The core may have concave portions such as grooves and concave holes on the outer surface thereof instead of the reflective layers. The concave portions are preferably arranged in the longitudinal direction of the core.

BRIEF DESCRIPTION OF THE DRAWINGS

FIG. 15 is a sectional view taken along 15—15 line in FIG. 13.

FIG. 16 is a sectional view showing a part of a meter case according to another embodiment, which part corresponds to the part shown in FIG. 6.

FIG. 17 is an enlarged view of part 17 in FIG. 16.

DETAILED DESCRIPTIONS OF THE PREFERRED EMBODIMENTS

Figure 4:
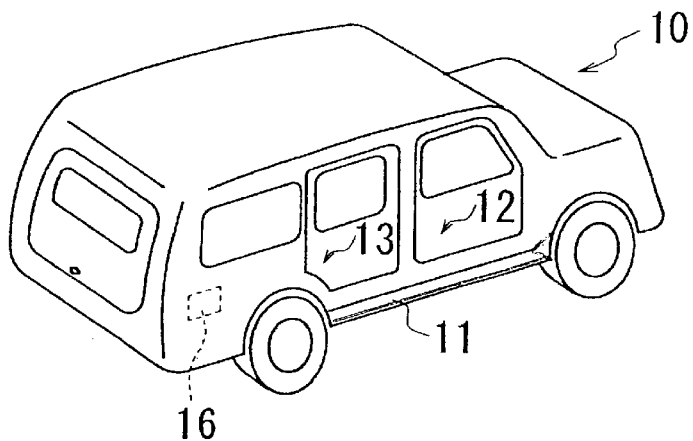
FIG. 4 is a perspective view of a vehicle according to an embodiment.
Figure 5:
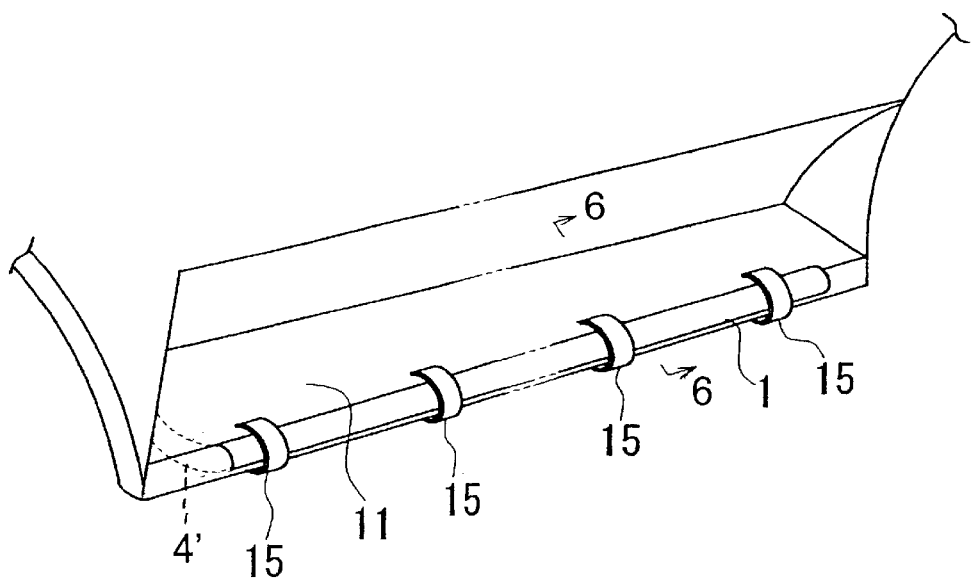
FIG. 5 is a perspective view of a running board of the vehicle in FIG. 4.
Figure 6:
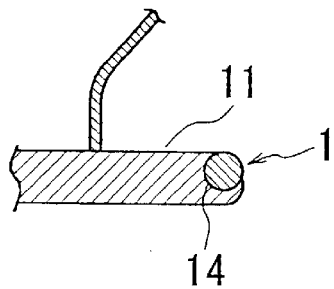
FIG. 6 is a sectional view taken along 6—6 line in FIG. 5.

Hereinafter, the present invention will be described in detail with reference to the drawings. FIG. 4 is a perspective view of a vehicle according to the embodiment, FIG. 5 is a perspective view showing a running board of the vehicle in FIG. 4, and FIG. 6 is a horizontal sectional view taken along 6—6 line in FIG. 5.

A vehicle 10 of 4WD off-road type is equipped with a running board 11 at a portion below doors 12, 13. A light transmitting tube 1 is installed along the side of the running board 11. In this embodiment, the running board 11 has a groove 14 at the upper edge of the side thereof, which was formed by making a concave along the upper edge of the side of the running board 11. The light transmitting tube 1 is installed in the groove 14 and fixed with band-like clamps 15. The light transmitting tube 1 is adhered or sticked to the groove 14 with a releasable adhesive or adhesive mass so that the light transmitting tube 1 does not move.

One end of the light transmitting tube 1 is connected to a light source unit 16 which is installed at the rearmost section of the cabin of the vehicle 10. The light source unit 16 is equipped with a light-emitting element such as LED which supplies a light to the light transmitting tube 1 and a circuit which drives the light-emitting element. When the light-emitting element emits a light, the light is emitted from the circumferential surface of the light transmitting tube 1 installed in the upper edge of the side of the running board 11, so that the side of the running board 11 seems to be shining. Therefore, the side of the running board 11 can be seen clearly when going in and out from the doors 12,13 at night, which is very convenient.

The light source unit 16 may be arranged in a place except the inside of the cabin, where maintenance of the light source unit 16 can be carried out easily. For example, in case of a vehicle with a trunk, the light source unit 16 may be installed in the trunk.

The maintenance of the light source unit 16 can be carried out easily by installing the light source unit 16 in a place far from the running board where maintenance of the light source unit can be carried out easily. The light transmitting tube is low in weight even when the light transmitting tube has a large length. Because only light passes through the light transmitting tube 1, a short circuit does not occur even if the tube is in contact with water or the tube breaks.

Because the light transmitting tube 1 needs to emit light only from its part arranged in the side of the running board 11, other part of the tube 1 is covered with a reflective protection layer so as not to emit light.

In the embodiment, an off-road type of motorcar is illustrated. However, the light transmitting tube may be installed in an entrance of other types of vehicles, for example, a bus, a truck, an electric train, a steam train, a diesel railcar, and the like.

Figure 7:
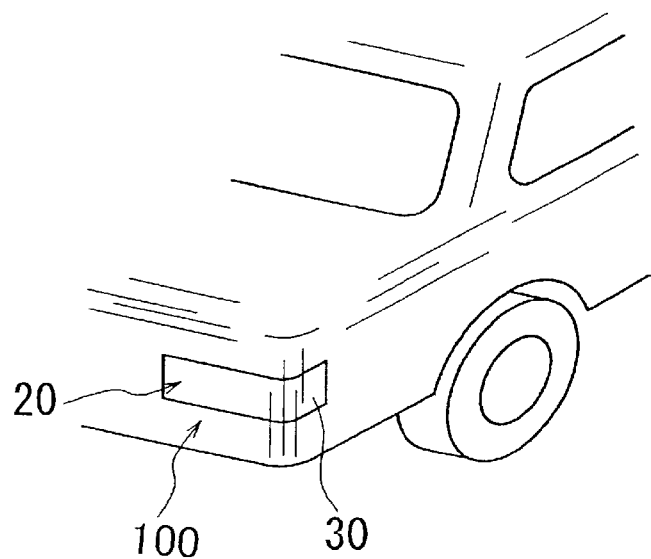
FIG. 7 is a perspective view showing the back of a vehicle equipped with a lamp device for a vehicle according to an embodiment.
Figure 8:
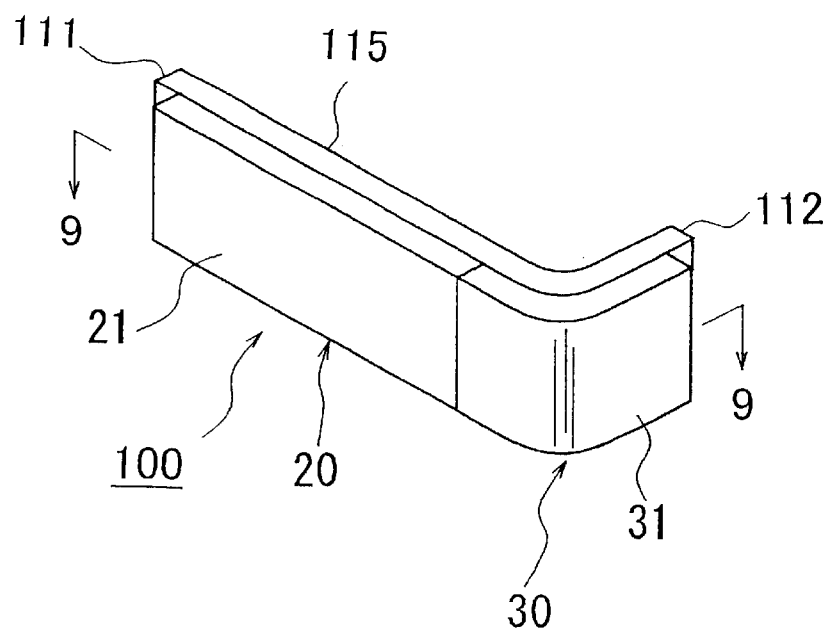
FIG. 8 is a perspective view showing the lamp device in FIG. 7.
Figure 9:
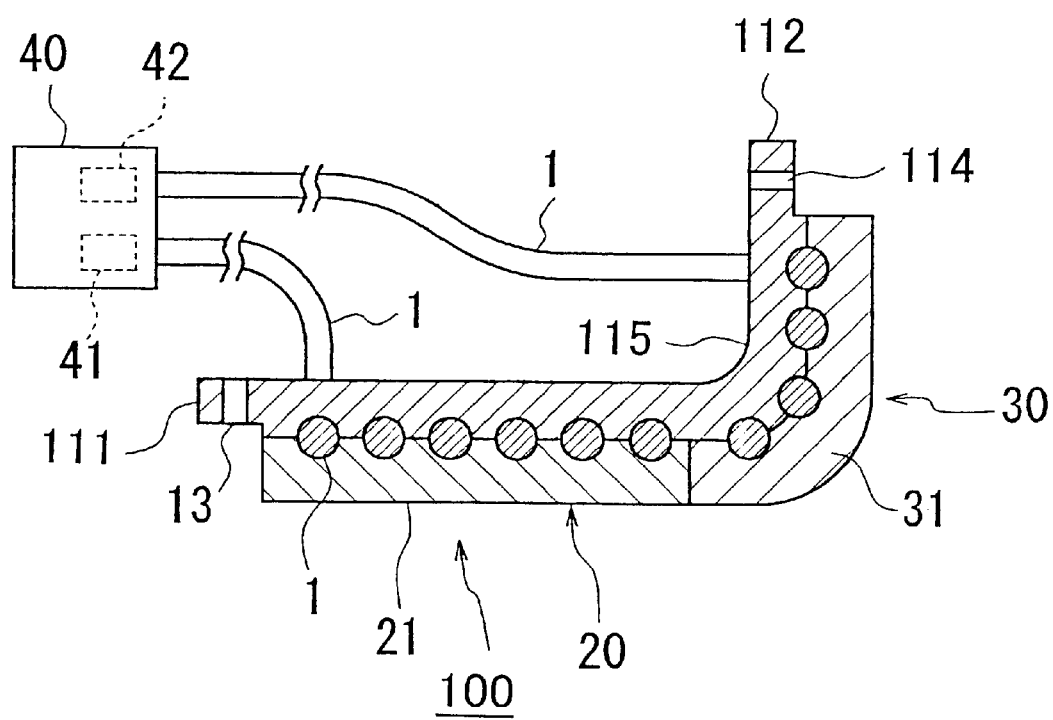
FIG. 9 is a horizontal sectional view taken along 9—9 line in FIG. 8.
Figure 10:
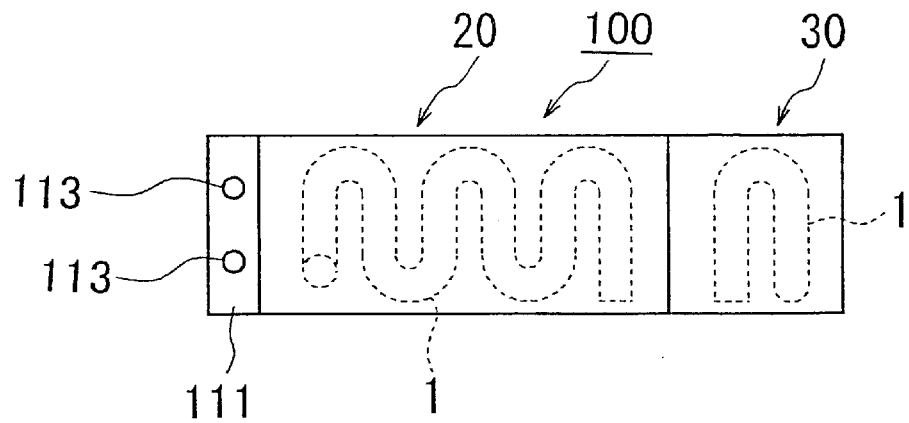
FIG. 10 is a front view of the lamp device in FIGS. 7–9.

FIG. 7 is a perspective view showing the back of a vehicle equipped with a lamp device for a vehicle according to an embodiment, FIG. 8 is a perspective view showing the lamp device in FIG. 7, FIG. 9 is a horizontal sectional view taken along 9—9 line in FIG. 8, and FIG. 10 is a front view of the lamp device for a vehicle.

A lamp device for a vehicle 100 shown in FIGS. 7–10 is equipped with a stop lamp part 20 and a winker lamp part 30. The lamp device 100 is fixed to the body of the vehicle with flanges 111, 112 which are installed in both sides of the lamp device 100. Numerals 113,114 show through holes for bolts which are provided in these flanges 111, 112. The stop lamp part 20 has a red transparent outer panel 21, and the winker lamp part 30 has a yellow transparent outer panel 31. The light transmitting tubes 1 are arranged in a zigzag line on the back of the outer panels 21, 31 separately, and a white backing plate 115 is arranged so as to support and protect these light transmitting tubes 1. Mating surfaces of the outer panels 21,31 and the backing plate 115 are rough so that light emitted from the light transmitting tubes 1 is reflected irregularly by the rough surfaces.

The light transmitting tubes 1,1 of the stop lamp part 20 and the winker lamp part 30 are extended out of the lamp device 100, and enter into a light source unit 40, respectively. The light source unit 40 is equipped with a light-emitting element 41 such as LED which supplies light to the transmitting tube 1 located in the stop lamp part 20 and another light-emitting element 42 which supplies light to the light transmitting tube 1 located in the winker lamp part 30, and an electronic circuit for driving these light-emitting elements 41, 42. When the light-emitting element 41 emits light, the light is emitted from the circumferential surface of the light transmitting tube 1 located in the stop lamp part 20. As a result, the whole of the stop lamp part 20 emits red light. When the light-emitting element 42 emits light, the light is emitted from the circumferential surface of the light transmitting tube 1 located in the winker lamp part 30. As a result, the whole of the winker lamp part 30 emits yellow light. The light source unit 40 is located in a place (for example, in a trunk) in which the light source unit 40 can be repaired easily.

The light source unit 40 can be improved in repairability when it is installed in a place far from the lamp device where maintenance of the light source unit 40 can be carried out easily. The light transmitting tube is low in weight even when the light transmitting tube used has a long length. Because only light passes through the light transmitting tube, a short circuit does not occur even if the tube is in contact with water or the tube breaks.

Figure 11:
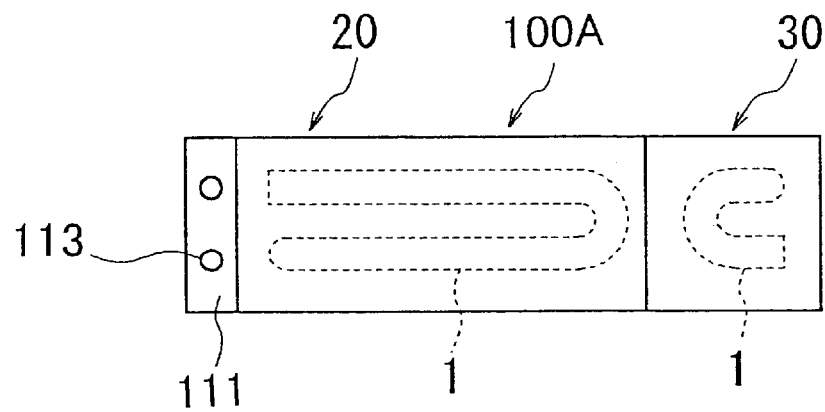
FIG. 11 is a front view of a lamp device for a vehicle according to another embodiment.

In the embodiment according to FIGS. 7–10, each light transmitting tube 1 is extended in up and down directions in the stop lamp part 20 and the winker lamp part 30, but the light transmitting tube 1 may be extended horizontally in a lamp device 100A for a vehicle shown in FIG. 11. Other numerals in FIG. 11 show the same parts as the numerals in FIG. 10.

For example, lamp devices 100, 100A in FIGS. 7–11 may be manufactured by the following procedure: after outer panels 21,31 are molded with a two-material extrusion molding machine, light transmitting tubes 1,1 are arranged in a mold, and then a backing plate 115 is formed thereon by injection molding. They may be manufactured by another procedure as follows: outer panels 21,31 are molded with a two-material extrusion molding machine beforehand, and then the light transmitting tubes 1,1 are sandwiched in between these outer panels 21,31 and a backing plate 115.

Figure 12:
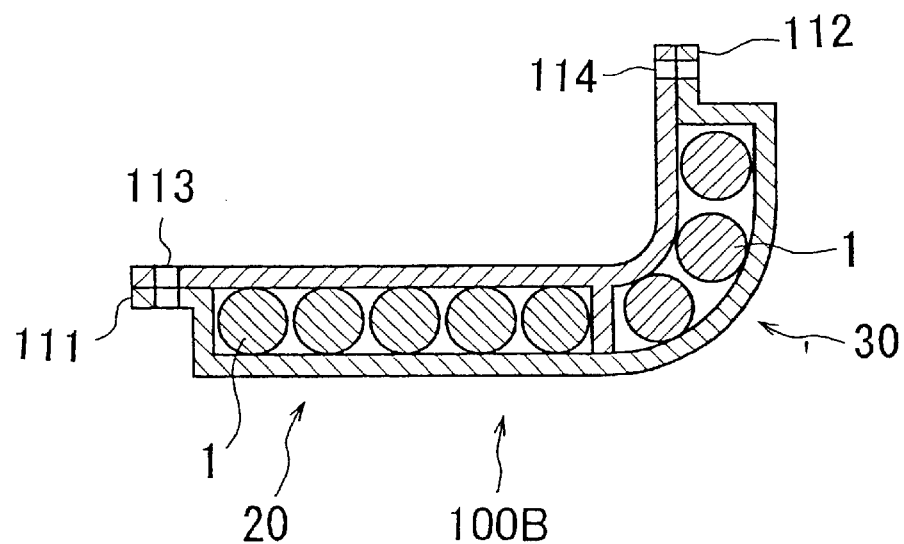
FIG. 12 is a horizontal sectional view of the lamp for a vehicle according to further another embodiment.

The lamp device for a vehicle may have a hollow body so that the light transmitting tube 1 can be arranged within the body thereof, like as a lamp device 100B shown in FIG. 12. Other numerals in FIG. 12 show the same parts as the numerals in FIG. 9.

Figure 13:
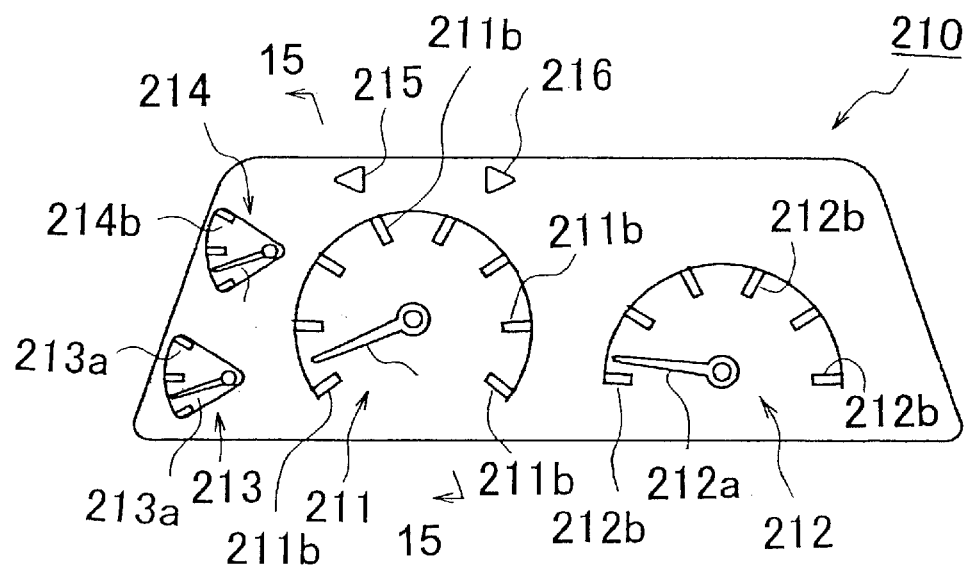
FIG. 13 is a front view of a meter case according to an embodiment.
Figure 14:
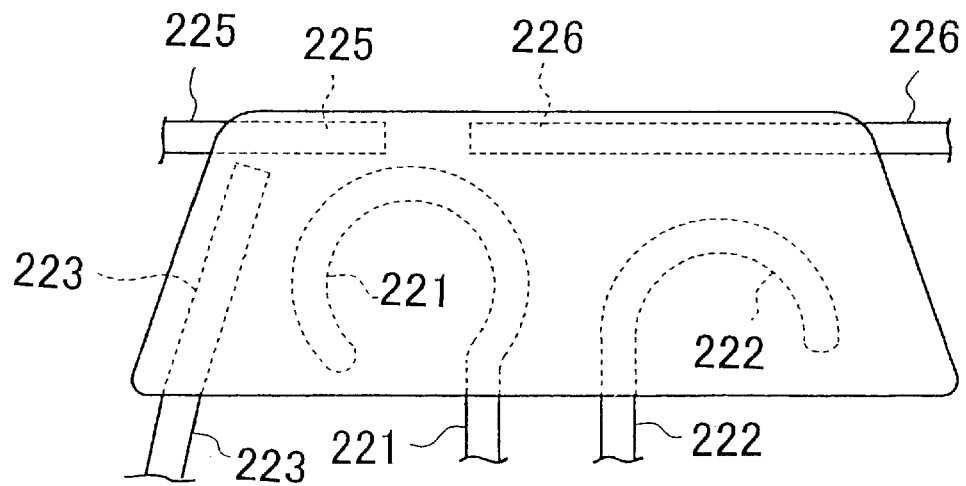
FIG. 14 is an explanatory drawing illustrating arrangement of a light transmitting tube of the meter case in FIG. 13.

FIG. 13 is a front view of a meter case according to an embodiment, FIG. 14 is an explanatory drawing an illustrating arrangement of a light transmitting tube of the meter case in FIG. 13, FIG. 15 is a sectional view taken along 15—15 line in FIG. 13, FIG. 16 is a part of a meter case according to another embodiment, which part corresponds to the part indicated in FIG. 6, and FIG. 17 is an enlarged view of part 17 in FIG. 16.

The meter case shown in FIGS. 13–15 has a main body 210, a speedometer 211, a tachometer 212, a hydraulic meter 213, and a radiator water temperature gauge 214 which are installed in the front of the main body 210. The meters 211–214 have needles 211a, 212a, 213a and 214a and sets of scales 211b, 212b, 213b and 214b, respectively. In each set, the scales are arranged in such a manner that the distance between each scale and the axis of rotation of the needle is the same. These sets of scales 211b, 212b, 213b, 214b are composed of transparent resin parts which penetrate the main body 210. Light transmitting tubes 221, 222, 223 are arranged along the back of these scales, respectively. Each of these light transmitting tubes 221–223 is so constituted that the tube emits light from a part of the circumferential surface which part faces the back of the main body 210. The detailed structure of the light transmitting tube will be described later with reference to FIGS. 1–3.

The main body 210 of the meter case is equipped further with winker indication parts 215, 216. On the back of them, light transmitting tubes 225, 226 are installed, respectively.

These light transmitting tubes 221, 222, 223, 225, 226 (hereinafter, referred to as "221–226") are extended out of the under part or side of the meter case and enter into a light source unit (not shown), respectively. The unit is positioned apart from the meter case. The light source unit has light-emitting elements such as LED and driving circuits, in which the light-emitting elements face the top ends of the light transmitting tubes 221–226, respectively, and the driving circuits drive the light-emitting elements, separately. When each light-emitting element such as LED lights up or flashes on and off, the light from the element is introduced into the light transmitting tube of which the top end faces the element, and emitted from the circumferential surfaces of the tube. Then, the light goes through the sets of scales 211b–214b or the winker indication parts 215,216 and is recognized visually by a crew.

Maintenance of the light source unit can be carried out easily because the unit is disposed in a place far from the meter case where maintenance of the light source unit can be carried out easily. The light transmitting tube is low in weight even when the light transmitting tube is long. Because only light passes through the light transmitting tube, a short circuit does not occur even if the tube is in contact with water or the tube breaks.

Because each of these light transmitting tubes 221–226 is needed to emit light from its outer surface facing the body 210 of the meter case (particularly, from a part located at the back of the scales or indication parts), other part may be made of a light transmitting tube which does not emit a light from its outer surface area. A circuit substrate 230 is installed at the back of the body 210 of the meter case. The circuit substrate 230 is equipped with a circuit for driving needles 211a–214a and an actuator 231 for driving them.

The meter case shown in FIGS. 16, 17 has a light-transfer board 240 which covers almost the whole back area of the body 210 of the meter case. The light-transfer board 240 has a transparent main board 241, a reflective layer 242 formed on the back surface of the main board 241, and a light scattering layer 243 formed on the front surface of the main board 241. A light transmitting tube 1 is disposed along one end of the light-transfer board 240. The light transmitting tube 1 is so constituted that it emits a light from its circumferential surface toward the one end of the light-transfer board 240. The light transmitting tube 1 is extended out of the meter case and extended into the aforementioned light source unit. A light emitting element such as LED faces one end of the light transmitting tube 1. Other end of the light-transfer board 240 is overlaid with a reflective layer.

The construction of the light transmitting tube 1 is the same as those of the aforementioned light transmitting tubes 221, 222, 223, 225, 226.

Figure 1:
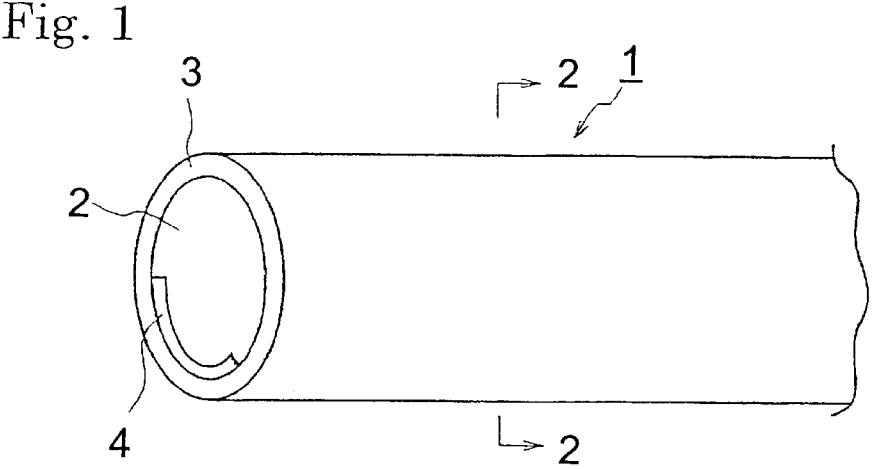
FIG. 1 is a perspective view showing a light transmitting tube according to the present invention.
Figure 2:
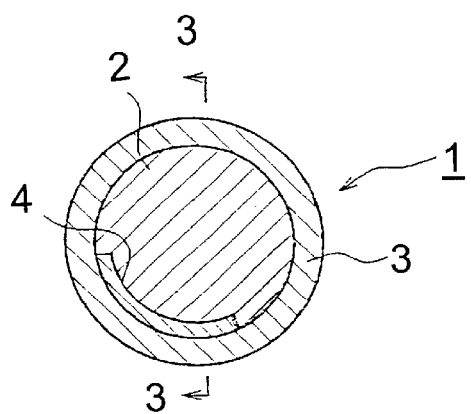
FIG. 2 is a sectional view taken along 2—2 line in FIG. 1.
Figure 3:
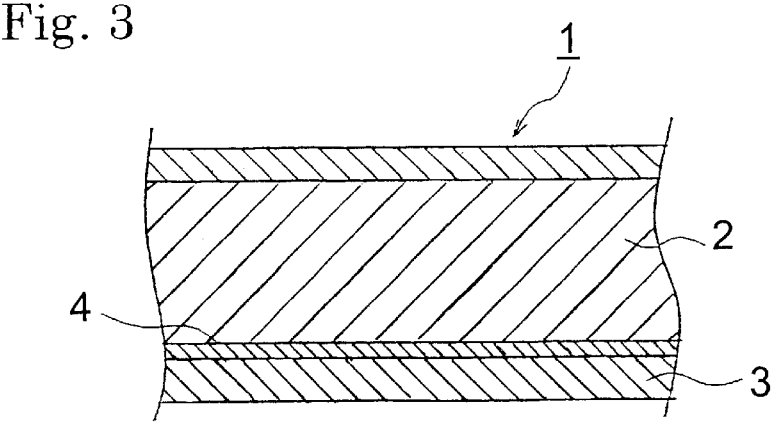
FIG. 3 is a sectional view taken along 3—3 line in FIG. 2.

The construction of the light transmitting tube 1 will be described in detail with reference to FIGS. 1–3. FIG. 1 is a perspective view of the light transmitting tube 1, FIG. 2 is a sectional view along 2—2 line in FIG. 1, and FIG. 3 is a view along 3—3 line in FIG. 2.

The light transmitting tube 1 is composed of a core 2, a tubular cladding 3 covering the core 2, and belt-like light reflective layer 4 formed between the inner surface of the cladding 3 and the core 2. The belt-like light reflective layer 4 extends in the longitudinal direction of the tube 1. The reflective layer 4 may be formed in such a manner that it invades slightly into the inside of the outer surface of the core 2.

As a material for forming the core 2, a transparent material having a higher refractive index than a material which composes the tubular cladding 3 is used. Generally, the material to be employed is suitably selected from the group consisting of a plastic material, an elastomer material, and the like, according to objects.

Examples of the core material are transparent materials made of a polystyrene, a styrene, a methyl methacrylate copolymer, a (meth-)acrylic resin, a polymethyl pentene, an allyl glycol carbonate resin, spiran resin, an amorphous polyolefin, a polycarbonate, a polyamide, a polyarylate, a polysulfone, a polyallylsulfone, a polyether sulfone, a polyether imide, a polyimide, a diallyl phthalate, a fluororesin, a polyester carbonate, norbornene resin(ARTON), cycloaliphatic acrylic resin, a silicon resin, an acrylic rubber, a silicon rubber, and the like, where "(meth-)acrylic" means "acrylic" or "methacrylic".

A cladding material can be selected from transparent materials having low refractive index. For example, organic materials such as a plastic material and an elastomer material can be used.

Examples of the cladding materials are a polyethylene, a polypropylene, a polymethyl methacrylate, and polymethyl methacrylate fluoride, a polyvinyl chloride, a polyvinylidene chloride, a polyvinyl acetate, a polyethylene-vinyl acetate copolymer, a polyvinyl alcohol, a polyethylene-polyvinyl alcohol copolymer, fluororesin, a silicon resin, a natural rubber, a polyisoprene rubber, a polybutadiene rubber, a styrene-butadiene copolymer, a butyl rubber, a halogenated butyl rubber, a chloroprene rubber, an acryl rubber, an ethylene-propylene-diene copolymer (EPDM), an acrylonitrile-butadiene copolymer, a fluorine-contained rubber, a silicon rubber, and the like.

Among the above materials, from the viewpoint of optical properties such as transparence and refractive index, and workability of co-extrusion, a polystyrene, a polycarbonate, a styrene-(meth-)acrylic copolymer (MS polymer), and the like, are suitable for the core material, and (meth-)acrylic polymer and the like are suitable for the cladding material.

A reflective layer is preferably made of a (meth-)acrylic polymer containing a white pigment or a light scattering material.

As a white pigment or a light scattering material, one or more than two among organic polymer particles such as silicone resin particles and polystyrene resin particles, metallic oxide particles such as $Al_2$, $O_3$, $TiO_2$ and $SiO_2$, sulfate particles such as $BaSO_4$, and a carbonate particle such as $CaCO_3$ can be used.

In case of considering a reflective efficiency and workability of co-extrusion, an average particle size of these white pigments or light scattering materials is preferably 0.1–200 μm, more preferably 0.5–50 μm, and the content of these white pigments or light scattering materials in a material for forming a reflective layer (reflective material) is preferably 0.5–20 wt. %, more preferably 1–10 wt. %.

The thickness of the reflective layer 4 is not limitative and is preferably 10–200 μm, more preferably 50–100 μm. If the reflective layer 4 is too thin, the amount of light to be reflected by the reflective layer 4 is too less, and thus the brightness of light to be emitted from the light transmitting tube 1 is too low. On the other hand, if the reflective layer 4 is thick, the amount of light to be reflected by the reflective materials 4 is large, and thus the brightness of light to be emitted from the light transmitting tube 1 is high. However, these phenomena are found out only at a part of the light transmitting tube 1 relatively near the light source. That is, there are cases where the brightness of light to be emitted from the light transmitting tube 1 becomes too low at a place relatively far from the light source in case of using the reflective layer 4 having too large thickness.

The diameter of the core 2 is not limited and it is generally taken as 2–30 mm, preferably 5–15 mm. The thickness of the tubular cladding 3 is generally taken as 0.05–4 mm, particularly 0.2–2 mm.

The light transmitting tube may have a reflective protection layer 4' formed on the outer surface of the tubular cladding 3 so as to cover a part of the circumferential surface thereof, which part does not emit a light. In such a light transmitting tube with the reflective protection layer, in case that the reflective layer 4 has flaws such as pinholes, the reflective protection layer reflects the light which passes through the flaws to leak into the back of the reflective layer 4 or leaks from the side of the reflective layer 4. Therefore, the reflective protection layer decreases light loss and thus improves the brightness of light to be emitted from the portion of the tube opposite to the reflective layer 4.

It is desirable that a part of the light transmitting tube which part is pulled out of the body of a vehicle is covered with the reflective protection layer all around its circumferential surface.

A material for the reflective protection layer is preferably so constituted that the reflective protection layer does not allow light leaked from the reflective layer 4 to pass through and does not absorb the light but reflect the light effectively. For example, metal foils or metal sheets made of silver, aluminum, etc., and coating films in which the aforementioned light scattering particles are dispersed can be used.

The light transmitting tube can be manufactured by the following method: a multi-material extrusion molding machine, for example, a three-material extrusion molding machine having three screw sections is used; a core material, a cladding material, and a reflective material containing a white color pigment or a light scattering material are introduced into the extrusion molding machine; in a simultaneous manner, the core material is extruded to be formed into a solid cylindrical core member, the reflective material is extruded into plural belt-like reflective layers formed on the outer surface of the solid cylindrical core member and the cladding material is extruded into a tubular member covering the solid cylindrical core member and the belt-like reflective layers.

With the use of the above method, three kinds of materials having different refractive indexes and different physical properties may be extruded simultaneously so as to be formed into a laminated structure having three different functions, during only one operation. Since this method allows the laminated structure to be formed at a high speed, and since the different layers are allowed to be laminated together while they are still in a soft state, it is allowed to manufacture a light transmitting tube having an excellent adhesion between different layers at high efficiency.

The reflective protection layer may be formed by adhering a metallic foil or metallic sheet to the outer surface of the cladding or by coating the outer surface of the cladding with a coating material in which light scattering particles are dispersed. The reflective protection layer may also be formed by extruding simultaneously.

Another light transmitting tube which is used suitably in the present invention will be illustrated with reference to FIGS. 18–27.

Figure 18:
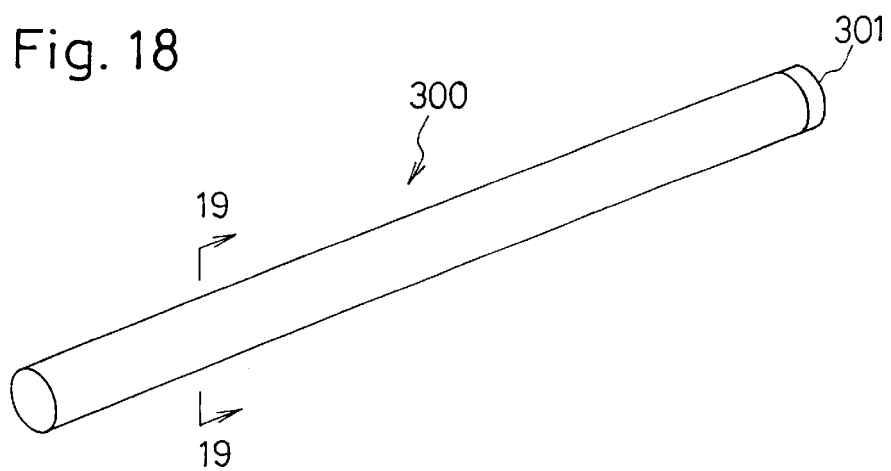
FIG. 18 is a perspective view of another light transmitting tube according to the present invention.
Figure 19:
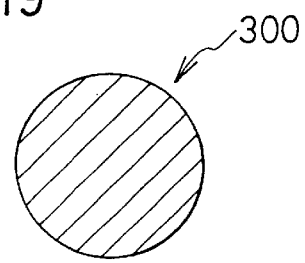
FIG. 19 is a sectional view taken along 19—19 line in FIG. 18.

A light transmitting tube 300 shown in FIGS. 18, 19 is composed of a core made of a polymethyl (meth-)acrylate (PMMA) and a reflective body 301 installed at the end of the core. Because the PMMA absorbs light in small amount, the brightness of the circumferential surface of the tube is high. The reflective body 301 may be omitted.

The diameter of the core is preferably 2–30 mm, more preferably 5–15 mm.

Though not illustrated, a cladding made of fluororesin may be installed at the outersurface of the core made of the PMMA. The cladding made of fluororesin encloses the whole circumferential surface like the above cladding 3. The thickness of the cladding made of the fluororesin is preferably 0.05–4 mm, more preferably 0.2–2 mm.

Figure 20:
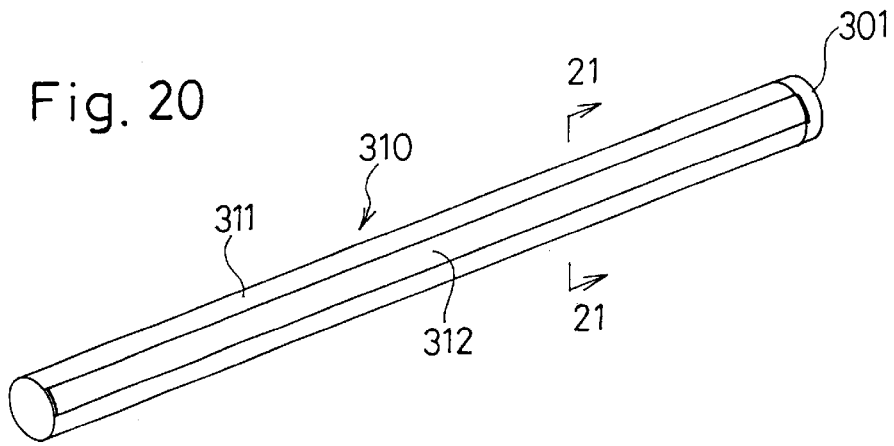
FIG. 20 is a perspective view of further another light transmitting tube according to the present invention.
Figure 21:
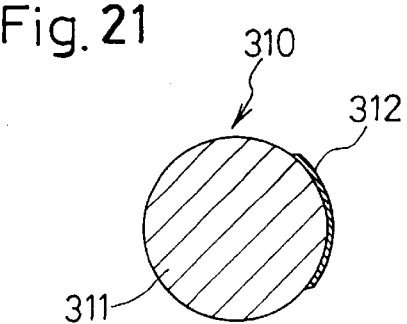
FIG. 21 is a sectional view taken along 21—21 line in FIG. 20

A light transmitting tube 310 shown in FIGS. 20, 21 has a core 311 made of PMMA, a reflective body 301 installed at the end of the core 311, and a reflective layer 312 installed on the circumferential surface of the core 311. The reflective layer 312 extends in the longitudinal direction of the core 311. Alight passing through the core 311 is reflected and scattered by the reflective layer 312 so that the light is emitted from the circumferential surface of the core 311 except for the area on which the reflective layer 312 is installed.

The reflective layer 312 is preferably made of (meth-)acrylic polymer including a white pigment or a light scattering material.

As a white pigment or a scattering material, one or more than two among organic particles such as silicon resin particles and polystyrene resin particles, metallic oxide particles such as $Al_2O_3$, $TiO_2$ and $SiO_2$ (silica), sulfate particles such as $BaSO_4$, and carbonate particles such as $CaCO_3$ can be used. Particularly, among them, $TiO_2$, $SiO_2$ and $BaSO_4$ are suitable.

When taking account of reflection efficiency and workability of simultaneous extrusion, an average particle size of the white pigment or light scattering material is preferably 0.1–200 μm, more preferably 0.5–50 μm, and the amount of the white pigment or light scattering material in a material for composing the reflective layer (reflective material) is preferably 0.5–20 wt. %, more preferably 1–10 wt. %.

Though the thickness of the reflective layer is not limited, it is preferably 10–200 μm, more preferably 50–100 μm. If the reflective layer 4 is too thin, the amount of light to be reflected by the reflective materials 4 is too less, and thus the brightness of light to be emitted from the light transmitting tube 1 is too low. On the other hand, if the reflective layer 4 is thick, the amount of light to be reflected by the reflective materials 4 is large and thus the brightness of light to be emitted from the light transmitting tube 1 is high. However, these phenomena are found out only at a part of the light transmitting tube 1 relatively near the light source. That is, there are cases where the brightness of light to be emitted from the light transmitting tube 1 becomes low at a place relatively far from the light source in case of using the reflective layer 4 having too large thickness.

The light transmitting tube may have a reflective protection layer formed on the outer surface of the tubular cladding 3 so as to cover the reflective layer 312. In such a light transmitting tube with the reflective protection layer, in case that the reflective layer 312 has flaws such as pinholes, the reflective protection layer reflects the light which passes through the flaws to leak into the back of the reflective layer 312 or leaks from the side of the reflective layer 312. Therefore the reflective protection layer thereby decreases light loss and thus improves the brightness of light to be emitted from the portion of the tube opposite to the reflective layer 312.

It is desirable that a part of the light transmitting tube pulled out of the body of a vehicle is covered with the reflective protection layer all along its circumferential surface.

A material for the reflective protection layer is preferably so composed that the reflective protection layer does not allow a light leaked from the reflective layer 312 to pass through and does not absorb the light but reflect the light effectively. For example, metal foils or metal sheets made of silver, aluminum, etc., and coating films in which aforementioned light scattering particles are dispersed can be used.

Figure 22:
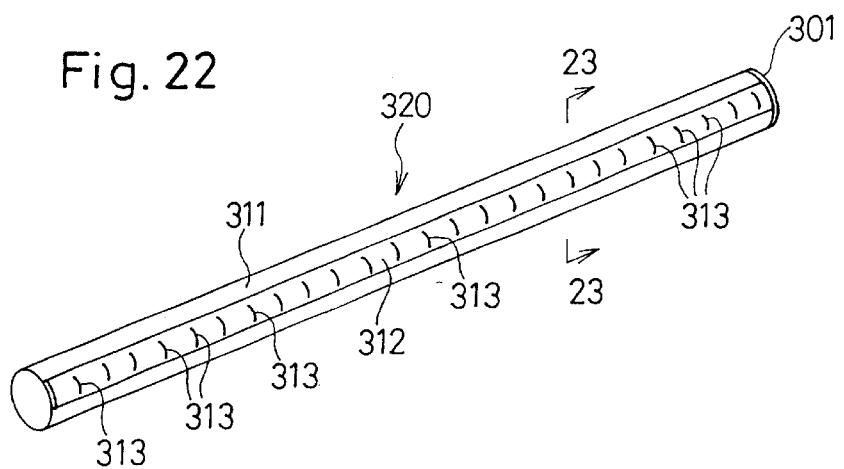
FIG. 22 is a perspective view of a light transmitting tube according to the present invention.
Figure 23:
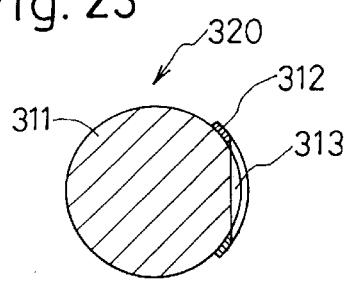
FIG. 23 is a sectional view taken along 23—23 line in FIG. 22.

A light transmitting tube 320 shown in FIGS. 22, 23 have notch-like grooves 313 on its reflective layer 312. These grooves 313 penetrate through the reflective layer 312, so as to notch the core 311.

It is desirable that each of these grooves 313 is provided so as to extend in the circumferential direction of the light transmitting tube 320 (that is, perpendicular to the extending direction of the light transmitting tube 320). For example, these grooves 313 can be formed by pushing a spur gear-like rotator against the circumferential surface of the light transmitting tube.

These grooves 313 scatter a light passing through the core 311 of the light transmitting tube 320 and coming into the reflective layer 312 so that the light is emitted from the circumferential surface of the core 311. An extremely small amount of light is emitted from these grooves 313 toward the outside of the light transmitting tube. However, the amount of the light emitted out from these grooves is so small that the loss of light is very small.

It is desirable that the groove 313 has a V-shaped cross section, in which the angle of divergence between the slopes thereof is 30–60°, for example, 45°. The clearance between these grooves 313 is preferably 1 to 5 mm, more preferably 2 to 4 mm. However, the shape of the grooves 313 is not limited to the V-shaped cross section. For example, the grooves 313 may have a half-round cross section.

Other constructions of the light transmitting tube shown in FIGS. 22, 23 are the same as those of the light transmitting tube shown in FIGS. 20, 21, in which the same numerals show the same portions.

Figure 24:
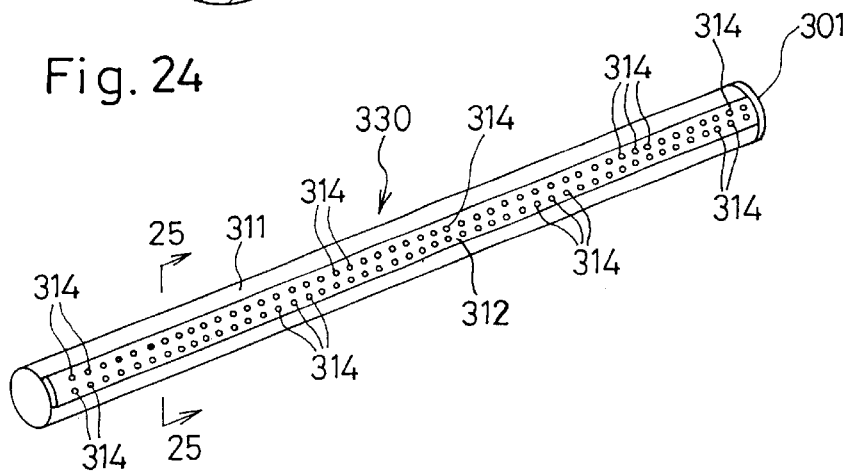
FIG. 24 is a perspective view of a light transmitting tube according to the present invention.
Figure 25:
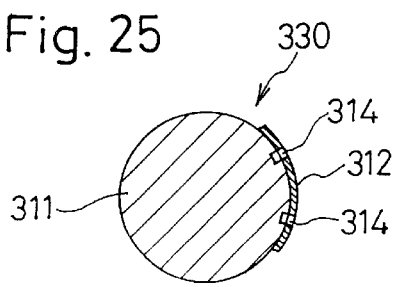
FIG. 25 is a sectional view taken along 25—25 line in FIG. 23.
Figure 26:
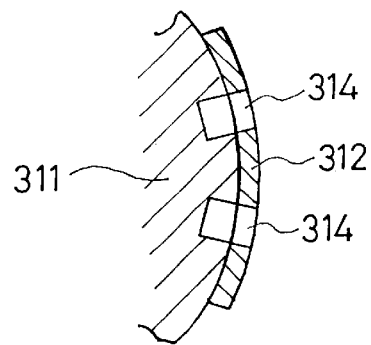
FIG. 26 is an enlarged view showing a surface of the light transmitting tube in FIG. 24.

Alight transmitting tube 330 shown in FIGS. 24, 25 and 26 has a lot of concavities 314 in a reflective layer 312. These concavities 314 penetrate through the reflective layer 312 so as to form concavities on the surface of the core 311. These concavities 314 are provided in a line(s) along the longitudinal direction of the core 311 at specified intervals. It is desirable that two or more lines of these concavities 314 are provided.

Figure 27:
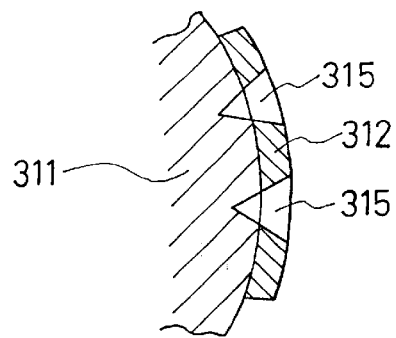
FIG. 27 is an enlarged view showing a surface of another light transmitting tube.

Though these concavities 314 have a cylindrical shape as shown in FIG. 26, concavities 315 may have a conical shape as shown in FIG. 27. These concavities 315 also penetrate through the reflective layer 312 and cut into the surface of the core 311.

These concavities 314, 315 scatter a light passing through the core 311 of the light transmitting tube 320 and coming into the reflective layer 312 so that the light is emitted from the circumferential surface of the core 311. An extremely small amount of light is emitted from these concavities 314, 315 toward the outside of the light transmitting tube. However, the amount of the light emitted out from the sets of the concavities 314, 315 is so small that the loss of light is very small.

Figure 28:
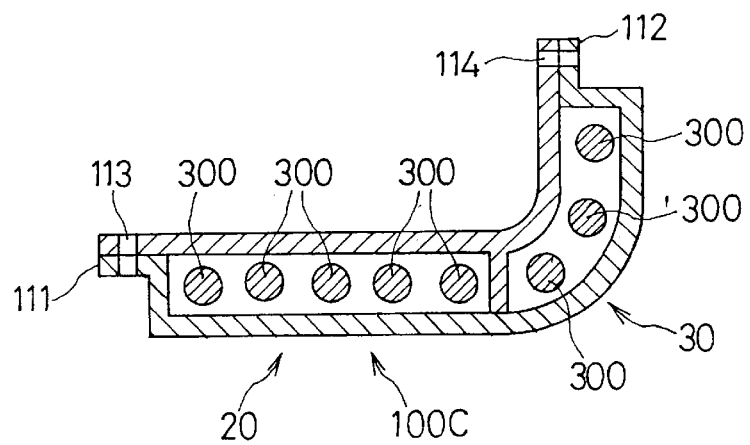
FIG. 28 is a horizontal sectional view showing a lamp device for a vehicle according to another embodiment of the present invention.

Each of the light transmitting tubes as shown in FIGS. 18–27 which has a core covered with no cladding is incorporated into a lamp device for a vehicle in such a manner that the tube is not in contact with the casing of the lamp device as shown in FIG. 28. That is, the light transmitting tube 300 is arranged in such a manner that there is a layer of air around the circumferential surface of the exposed core thereof. Other constructions of the light transmitting tube 300 shown in FIG. 28 are the same as those of FIG. 12.

Aforementioned grooves 313 and concavities 314, 315 may be provided on the core which does not have a reflective layer 4.

Examples of light transmission properties of the light transmitting tubes in FIGS. 18–27 will be illustrated in the following.

EXAMPLE 1

The core No. 1 is made of polystyrene.

The core No. 2 is made of styrene-acryl copolymer including 70 wt. % styrene.

The core No. 3 is made of PMMA.

Each core has a diameter of 12 mm and a length of 300 mm, and does not have a reflective layer nor a cladding is installed.

Each core was measured in its transmittance of light having wavelengths of 400 to 700 mm by introducing a white light emitted from LED thereinto from its one end to measure a light volume emitted from another end thereof. The results are shown in Table. 1.

TABLE 1

| core | light transmittance |
|---|---|
| No. 1 | 63% |
| No. 2 | 72% |
| No. 3 | 83% |

The results proved that the core made of PMMA has extremely high light transmittance.

EXAMPLE 2

Light transmitting tubes No. 4, 5, 6 were prepared by forming reflective layers on the cores No. 1, 2, 3 in Example 1, respectively, wherein the reflective layers are made of a metaacryl polymer including 10 wt. % $TiO_2$ pigment, and colored in white, furthermore the reflective layers have a thickness of 20 µm and a width of 3.5 mm.

The same white light as example 1 was introduced from both ends of each light transmitting tube to measure volumes of light emission at the parts of the circumferential surface thereof spaced 50 mm, 150 mm and 250 mm apart from said one ends, respectively.

The results are shown in Table 2.

TABLE 2

| | core | volume of light emission (cd/m²) | | |
|---|---|---|---|---|
| | | 50 mm | 150 mm | 250 mm |
| No. 4 | polystyrene | 510 | 460 | 510 |
| No. 5 | styrene-acrylic copolymer | 600 | 550 | 600 |
| No. 6 | PMMA | 760 | 700 | 760 |

As a result from Table 2, it is exemplified that the light transmitting tube No. 6 having the core made of PMMA emits a strong light. The reason is because light transmittance of PMMA is extremely high.

EXAMPLE 3

A lot of conic concavities were provided on the reflective layer of the light transmitting tube No. 6 to prepare a light transmitting tube No. 7. The angle at the corner of the conic concavities is 90 degrees and the depth of the concavities is 0.25 mm. The concavities penetrate through the reflective layer and cut into the face of the core. The diameter of the entrance section of the concavities is 1.2 mm. The concavities are arranged in two columns extending in the longitudinal direction of the light transmission, in which the concavities are arranged at 2.2 mm intervals, respectively. These two columns of the concavities are arranged at 2.2 mm intervals in the circumferential direction of the light transmitting tube. Therefore, the clearance between concavities arranged in the longitudinal direction is 1 mm and the clearance between concavities arranged in the circumferential direction is also 1 mm.

A lot of grooves each of which extends in the circumferential direction are provided on the reflective layer of the above light transmitting tube No. 6 to make the light transmitting tube No. 8 shown in FIGS. 22, 23.

Each groove provided at 2.7 mm intervals has a V-shaped cross section and the angle of its corner is 90 degrees. The maximum width of the entrance of each groove is 1.2 mm. Therefore, the clearance between these grooves are 1.5 mm.

Alight was introduced into the light transmitting tubes No. 7 and No. 8 under the same condition as the light transmitting tube No. 6 in the above Example 2 and the intensity of the light emitted from the circumferential surface of these was measured. The results are shown in Table 3. Table 3 also shows the data of the light transmitting tube No. 6 which has been shown in Table 2.

TABLE 3

| light transmitting tube | hollow portions | volume of light emission (cd/m²) | | |
|---|---|---|---|---|
| | | 50 mm | 150 mm | 250 mm |
| No. 6 | none | 760 | 700 | 760 |
| No. 7 | conic concavities are arranged at 2.2 mm intervals | 1100 | 1000 | 1100 |
| No. 8 | grooves are arranged at 2.7 mm intervals | 930 | 850 | 930 |

As results from Table 3, it is exemplified that the volume of the light emitted from the circumferential surface of the light transmitting tube increases when the concavities are provided.

EXAMPLE 4

A visible light having a wavelength of 400–700 nm was introduced into the aforementioned light transmitting tubes No. 6, 7, 8, respectively, and the volume of light emitted from another ends of those was measured in order to measure light transmittance of the each cores of those.

TABLE 4

| light transmitting tube | light transmittance |
|---|---|
| No. 6 | 36% |
| No. 7 | 25% |
| No. 8 | 28% |

As shown in Table 4, it is exemplified that the light volume passing through each of the light transmitting tubes No. 7 and No. 8 from one end to another end is small, while the light volume emitted from its circumferential surface is large.

EXAMPLE 5

The same concavities as those of the aforementioned light transmitting tube No. 7 are provided on the light transmitting tube No. 3, which is composed only of the core, to make a light transmitting tube No. 9.

On the circumferential surface of the transmitting tube No. 3 composed only of the core, the same grooves as those of the above light transmitting tube No. 8 were provided to make a light transmitting tube No. 10.

A light was introduced into each of the light transmitting tube No. 9 and No. 10 from its both ends under the same condition as the above Example 3 and the light volume emitted from the circumferential surface was measured.

The results are shown in Table 3. Table 3 also shows the data of No. 6 which has been shown in Table 2.

TABLE 5

| light transmitting tube | light reflective layer | hollow portions | volume of light emission (cd/m$^2$) | | |
|---|---|---|---|---|---|
| | | | 50 mm | 150 mm | 250 mm |
| No. 6 | installed | none | 760 | 700 | 760 |
| No. 9 | not installed | conic concavities | 950 | 900 | 950 |
| No. 10 | installed | grooves | 850 | 800 | 850 |

As shown in Table 5, it is exemplified that the light transmitting tube provided with the concavities or grooves instead of a reflective layer also emits a large volume of light.

EXAMPLE 6

The brightness of light leaked from the reflective layers of each of the light transmitting tubes No. 6, 7, 8 was measured.

A light was introduced from one end of each light transmitting tube and a light leaked from each tube was measured by using a brightness measuring equipment which was installed at an angle of 45° from the longitudinal direction of the core of the tube. The measurement results are shown in Table 6.

The brightness of the light leaked from the concavities or grooves of the light transmitting tubes No. 9 and No. 10 which have no reflective layer was measured by the same measurement method.

The results are shown in Table 6.

TABLE 6

| light transmitting tube | reflective layer | hollow portions | brightness of the leaked light (cd/m$^2$) |
|---|---|---|---|
| No. 6 | installed | none | 15 |
| No. 7 | installed | conic concavities | 10 |
| No. 8 | installed | grooves | 10 |
| No. 9 | not installed | conic concavities | 300 |
| No. 10 | not installed | grooves | 400 |

As shown in Table 6, it is exemplified that the installation of the reflective layer decreases the leakage of light considerably.

INDUSTRIAL APPLICABILITY

The vehicle of the present invention is mounted with a light transmitting tube, so that the light transmitting tube transmits light and emits the light out from its part positioned at the lower part of the entrance of the vehicle, and the light source unit thereof can be located at a place away from the entrance of the vehicle. As a result, the light source unit can be installed at a place where maintenance of the light source unit can be carried out easily.

The lamp device for a vehicle of the present invention emits light transmitted through the light transmitting tube, therefore the light source unit can be located at a place away from the lamp device. As a result, the light source unit can be installed at a place where maintenance of the light source unit can be carried out easily.

Because the lamp device for a vehicle of the present invention does not need space in the front of the reflective board, the lamp device can be made thinner. The body of the lamp device can be produced easily by injection molding and the like even when the body has complicated shape.

Because the meter case of the present invention has the light transmitting tubes for transmitting light to provide indications with the light, the light source unit can be located in a place which is away from the meter case. As a result, the light source unit can be installed in a place where maintenance of the light source unit can be carried out easily. The light transmitting tube is low in weight and excellent in durability, and has no fear of an electric leak; besides there is no fear of a short circuit in case of deformation by collisions with a vehicle.

What is claimed is:

1. A vehicle equipped with a light-emitting apparatus on a running board at an underside of an entrance thereof, wherein the light-emitting apparatus has a light transmitting tube which emits light from its circumferential surface, and a light source which is installed at one end of the light transmitting tube, said light transmitting tube having a tubular cladding made of a (meth-)acrylic polymer, a core situated inside the tubular cladding and formed of a material having a refractive index higher than that of the tubular cladding, said core being made of polystyrene, polycarbonate, styrene-(meth)acrylic copolymer or polymethyl (meth-)acrylate, and a belt-like reflective layer formed between the tubular cladding and the core and extending in a longitudinal direction of the tubular cladding, said reflective layer being made of a (meth-)acrylic polymer including a white pigment or a light scattering material, said light transmitting tube being an extrusion molded product integrally and simultaneously formed by the tubular cladding, core and reflective layer so that a light passing through the core is reflected and scattered by the reflective layer and emitted from an outer surface area opposite to the reflective layer of the tubular cladding.

2. A vehicle as claimed in claim 1, wherein the light transmitting tube is installed at a side edge of the running board.

3. A vehicle as claimed in claim 1, wherein the light transmitting tube is extended out of the running board, and said one end is an end of an extended tube.

4. A vehicle as claimed in claim 3, wherein the extended tube of the light transmitting tube extended out of the running board is covered with a reflective protection layer all around an entire circumferential surface thereof.

5. A vehicle as claimed in claim 1, wherein the core is made of polymethyl (meth-)acrylate.

6. A vehicle as claimed in claim 1, wherein plural hollow portions are provided at a circumferential surface of the core and the hollow portions are arranged in a longitudinal direction of the core so as to scatter the light passing through the core.

7. A vehicle as claimed in claim 6, wherein the hollow portions are concave holes.

8. A vehicle as claimed in claim 6, wherein the hollow portions are grooves, each of which extends in a circumferential direction of the core.

* * * * *